(12) United States Patent
Petri et al.

(10) Patent No.: US 10,635,694 B2
(45) Date of Patent: Apr. 28, 2020

(54) DEPLOYING UPDATES IN A DISTRIBUTED DATABASE SYSTEMS

(71) Applicant: Pivotal Software, Inc., San Francisco, CA (US)

(72) Inventors: Robert J. Petri, Santa Clara, CA (US); Eric Lalonde, Santa Clara, CA (US); Eric J. Herde, Santa Clara, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 15/379,306

(22) Filed: Dec. 14, 2016

(65) Prior Publication Data

US 2017/0168811 A1 Jun. 15, 2017

Related U.S. Application Data

(60) Provisional application No. 62/267,146, filed on Dec. 14, 2015.

(51) Int. Cl.
*G06F 9/46* (2006.01)
*G06F 8/65* (2018.01)
(Continued)

(52) U.S. Cl.
CPC .............. *G06F 16/285* (2019.01); *G06F 8/65* (2013.01); *G06F 9/4401* (2013.01); *G06F 9/46* (2013.01);
(Continued)

(58) Field of Classification Search
CPC .................. G06F 8/65; G06F 9/4401; G06F 17/30345–30598; G06F 9/44–4416; G06F 8/60–656

See application file for complete search history.

(56) References Cited

U.S. PATENT DOCUMENTS 5,278,759 A * 1/1994 Berra ..................... G06F 8/65
365/195
5,586,304 A * 12/1996 Stupek, Jr. ............. G06F 8/658
717/170

(Continued)

OTHER PUBLICATIONS

Valerio Panzica La Manna, "Dynamic Software Update for Component-based Distributed Systems", published by WCOP'11, Jun. 20-24, 2011, Boulder, Colorado, USA, pp. 1-8 (Year: 2011).*

(Continued)

*Primary Examiner* — Thuy Dao
*Assistant Examiner* — Zheng Wei
(74) *Attorney, Agent, or Firm* — Fish & Richardson P.C.

(57) ABSTRACT

Methods, systems, and apparatus, including computer programs encoded on computer storage media, for instrumentation and control of workloads in a massively parallel processing database. Deployment is in a cluster which mirrors the cluster of the database to be controlled. The system includes data publishing modules, action agents, rules processing modules, deployment managers, rule compilation and management tools. Together these provide a distributed, fault tolerant system for the automated rules-based control of work in a database cluster. For example, in deploying an update, a deployment manager pushes the update to one or more nodes and instructs each of the one or more nodes to restart in a bootstrap mode. The deployment manager generates a respective configuration package for each of the one or more nodes, and restarts each of the one or more nodes in a production mode.

12 Claims, 7 Drawing Sheets

(51) Int. Cl.
*G06F 9/4401* (2018.01)
*G06F 8/60* (2018.01)
*G06F 16/28* (2019.01)
*G06F 16/23* (2019.01)
*G06F 16/248* (2019.01)
*G06F 16/2455* (2019.01)
*G06F 16/2458* (2019.01)
*H04L 29/08* (2006.01)
*H04L 29/06* (2006.01)

(52) U.S. Cl.
CPC .......... *G06F 16/23* (2019.01); *G06F 16/2365* (2019.01); *G06F 16/248* (2019.01); *G06F 16/2455* (2019.01); *G06F 16/2471* (2019.01); *H04L 67/1097* (2013.01); *H04L 67/14* (2013.01); *H04L 67/146* (2013.01); *H04L 67/26* (2013.01); *H04L 67/42* (2013.01); *G06F 8/60* (2013.01)

(56) References Cited

U.S. PATENT DOCUMENTS

| | | | | |
|---|---|---|---|---|
| 5,913,056 A * | 6/1999 | Oliver | G06F 8/60 | 713/1 |
| 6,588,011 B1 * | 7/2003 | Giammaria | G06F 8/61 | 714/E11.135 |
| 6,684,397 B1 * | 1/2004 | Byer | G06F 8/61 | 717/174 |
| 6,714,966 B1 * | 3/2004 | Holt | H04L 12/1827 | 463/42 |
| 6,715,144 B2 * | 3/2004 | Daynes | G06F 8/61 | 717/168 |
| 6,721,946 B1 * | 4/2004 | Fogarty | G06F 8/63 | 717/175 |
| 6,725,453 B1 * | 4/2004 | Lucas | G06F 8/65 | 717/173 |
| 6,829,634 B1 * | 12/2004 | Holt | H04L 12/1827 | 370/236 |
| 6,941,430 B2 * | 9/2005 | Jones | G06F 8/656 | 711/162 |
| 7,039,638 B2 | 5/2006 | Zhang et al. | | |
| 7,281,036 B1 * | 10/2007 | Lu | H04L 29/12028 | 709/220 |
| 7,356,679 B1 * | 4/2008 | Le | G06F 17/30067 | 707/E17.01 |
| 7,376,945 B1 * | 5/2008 | Kakumani | G06F 8/67 | 717/135 |
| 7,698,698 B2 * | 4/2010 | Skan | G06F 11/1433 | 717/168 |
| 8,849,891 B1 * | 9/2014 | Suchter | G06F 9/5038 | 709/202 |
| 9,626,177 B1 * | 4/2017 | Madduri | G06F 8/65 | |
| 2003/0018637 A1 * | 1/2003 | Zhang | G06F 17/30705 | |
| 2003/0154471 A1 * | 8/2003 | Teachman | G06F 8/65 | 717/171 |
| 2004/0162955 A1 * | 8/2004 | Jones | G06F 8/656 | 711/162 |
| 2005/0192921 A1 | 9/2005 | Chaudhuri et al. | | |
| 2005/0222996 A1 | 10/2005 | Yalamanchi | | |
| 2005/0235282 A1 * | 10/2005 | Anderson | G06F 8/65 | 717/178 |
| 2006/0031831 A1 * | 2/2006 | Templin | G06F 8/61 | 717/175 |
| 2006/0075284 A1 * | 4/2006 | Skan | G06F 8/63 | 714/5.1 |
| 2006/0089973 A1 * | 4/2006 | Kramer | G06F 9/5066 | 709/208 |
| 2006/0101048 A1 | 5/2006 | Mazzagatti et al. | | |
| 2006/0235949 A1 * | 10/2006 | Tai | G06F 8/65 | 709/219 |
| 2007/0041386 A1 | 2/2007 | Mar et al. | | |
| 2007/0050240 A1 * | 3/2007 | Belani | G06Q 30/0284 | 705/13 |
| 2007/0088832 A1 | 4/2007 | Tsang | | |
| 2007/0204262 A1 * | 8/2007 | Ahluwalia | G06F 11/3688 | 717/168 |
| 2007/0220059 A1 | 9/2007 | Lu | | |
| 2007/0240145 A1 * | 10/2007 | Saroj | G06F 8/61 | 717/168 |
| 2010/0082812 A1 * | 4/2010 | Brady | H04L 41/0806 | 709/226 |
| 2010/0325624 A1 * | 12/2010 | Bartolo | G06F 8/61 | 717/176 |
| 2011/0131242 A1 | 6/2011 | Bent et al. | | |
| 2011/0283256 A1 * | 11/2011 | Raundahl Gregersen | G06F 8/656 | 717/108 |
| 2013/0117318 A1 | 5/2013 | Paul | | |
| 2014/0034721 A1 * | 2/2014 | Gadepalli | G06F 8/71 | 235/375 |
| 2014/0053149 A1 * | 2/2014 | Wu | G06F 8/61 | 717/176 |
| 2015/0074679 A1 | 3/2015 | Fenoglio et al. | | |
| 2015/0120645 A1 | 4/2015 | Varakur | | |
| 2015/0242197 A1 * | 8/2015 | Alfonso | G06F 8/65 | 717/173 |
| 2017/0168811 A1 * | 6/2017 | Petri | G06F 17/30345 | |
| 2017/0223075 A1 * | 8/2017 | Hong | G06F 8/65 | |
| 2017/0286094 A1 * | 10/2017 | Westerkowsky | H04W 4/70 | |

OTHER PUBLICATIONS

International Search Report and Written Opinion in International Application No. PCT/US2016/066712, dated Apr. 24, 2017, 20 pages.

\* cited by examiner

DEPLOYING UPDATES IN A DISTRIBUTED DATABASE SYSTEMS

BACKGROUND

This specification relates to managing query execution and resource allocation on distributed database systems.

In a distributed database system, e.g., a massively parallel processing (MPP) database system, data can be partitioned and stored on multiple hosts, also referred to as nodes. Each node can include one or more physical server computers. Each physical server computer can have its own operating system, processor and storage device. Upon receiving a query, a computer designated as a master node can parse the query and build a query plan. The master node can distribute the query to computers designated as segment nodes for processing. For various reasons, the partition of data may be uneven across the nodes. Workload on some nodes may be heavier than workload on other nodes. Imbalance of workload may affect efficiency of the distributed database system.

SUMMARY

A clustered database workload management system monitors and manages workload of queries on MPP database system including very large clusters of computers. The system performs the monitoring and managing using consistent self-describing data and a distributed, inference based rule processing module. The system addresses the problem of data item and statistic dissemination on a massive cluster in a scalable way. In addition, the system provides rules-based scheme to invoke self-describing actions in response to changes in environment or changes in workload on the MPP database system. For example, in deploying an update, a deployment manager pushes the update to one or more nodes and instructs each of the one or more nodes to restart in a bootstrap mode. The deployment manager generates a respective configuration package for each of the one or more nodes, and restarts each of the one or more nodes in production mode.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
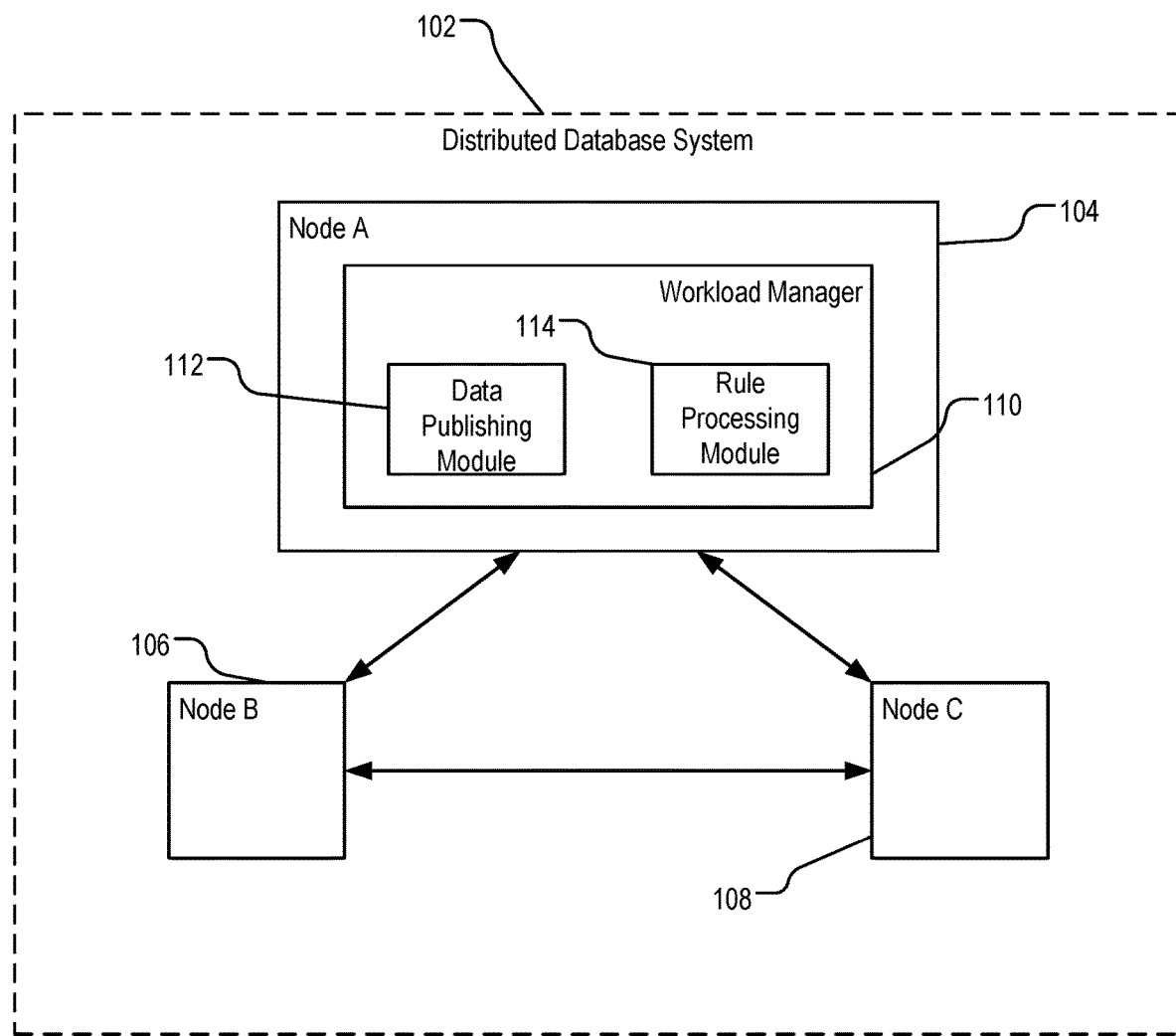
FIG. 1 is a block diagram illustrating an example distributed database system implementing rule-based workload management.

FIG. 1 is a block diagram illustrating an example distributed database system implementing rule-based workload management. A distributed database system 102 can be an MPP database system, e.g., Greenplum Database™ system. The distributed database system 102 includes multiple nodes. The nodes include one or more master nodes and one or more segment nodes. Each master node, also referred to as a master host, can be a separate physical server including its own operating system, memory, CPU, and storage device. Each master node can host metadata about segment nodes in the distributed database system 102. Each segment node, also referred to as a segment host, can be a separate physical server including its own operating system, memory, CPU, and storage device. Each segment node can host a portion of user data stored in the distributed database system 102. Each of nodes 104, 106 and 108 can be a segment node. A workload manager 110 of the distributed database system 102 is configured to perform operations of workload management, including monitoring queries, managing queries and managing resource queues.

The workload manager 110 performs tasks including, for example, monitoring database queries and hosting utilization statics; logging an event when resource usage a query exceeds a threshold; throttling resource usage, e.g., utilization rate of central processing unit (CPU), of a query when the resource usage of the query exceeds the threshold; terminating a query; detecting memory, CPU or disk I/O skew occurring during execution of a query; creating detailed rules to manage queries; and adding, modifying, or deleting database resource queues.

In some implementations, the workload manager 110 includes a set of database plugins. Application logic can be isolated in these plugins. The plugins can include a data publishing module 112, a rule processing module 114, a deployment manager, and a command-line interface. The deployment manager is programmed to query states of clusters of nodes in the database system periodically or upon request, report database cluster state and size to allow a workload manager to grow a subcluster automatically when the database is expanded, deploy configurations throughout the cluster. Additional details of the deployment manager are discussed below in reference to FIGS. 6 and 7.

Rules trigger actions when they match events. The data publishing module 112, also referred as a publication agent, on the segment host collects statistics and associated data. The rule processing module 114 matches the collected statistics and data to conditions associated with rules, and performs actions specified in the rules according to the match. The data publishing module 112 is programmed to publish information about active database queries, publish information about postgres processes, advertise query termination capability, advertise query throttling capability, and advertise threshold logging capability.

The rule processing module 114, also referred to as a rules engine, performs various operations including, for example, parsing rules, compiling rules, and managing workload on one or more nodes. The rule processing module 114 can determine one or more actions to perform based on matches between self-describing data and rules.

The data stored in distributed database system 102 is represented as independent data items in self-describing form. A self-describing data item, also referred to as a datum, includes a name, a type, a value and one or more scopes. Scopes are themselves self-describing and act as contextual metadata describing the data item. This structural data format can be expressed in any qualified transport format including, but not limited to, JSON, protobuf, WL, or YAML. The expression of data item context as unstructured scope metadata allows for the rule processing module 114 to infer relationships among different data items without predetermined schema or knowledge of the value and type of the data item. Data items flow throughout the cluster of nodes in distributed database system 102 using a publish/subscribe model. The publish/subscribe model allows fine grained control of data flow throughout the cluster.

A rule includes an action and a condition including an arbitrarily complex Boolean expression. Actions are concrete tasks that can be invoked in response to a rule activation. Similar to the data model, these actions are advertised and described at runtime. An action includes a scope, name and arguments. The scope provides loose contextual information about the context in which the action will execute. Additional details on the action and the associated condition in a rule are described in reference to FIG. 2.

When a rule is activated, the rule processing module 114 fulfills the actions argument and scope requirements through inference driven by each data item referenced and matched in the rule. The rule processing module 114, or another component of the distributed database system 102, can compile a rule a form that facilitates rapid parallel execution. The rule processing module 114 subscribes to relevant global and local data for its assigned domain. The rule processing module 114 infers contextual connections between data items by following paths of commonality of the scope metadata. The paths are described in additional details in reference to FIG. 2. The rule processing module 114 evaluates rules in parallel against the totality of subscribed data. The rule processing module 114 then invokes actions of activated rules.

An instantiation of a rule processing module executes on every node, including the nodes 104, 106 and 108 in the database system 102. The rule processing module 114 can operate on local data related to the node 104 in addition to global data available to all instances of rule processing modules. Rules propagate from to all nodes in an eventually consistent model and each instance of the rule processing module can operate independently if a service interruption isolates it from the rest of the cluster.

Figure 2:
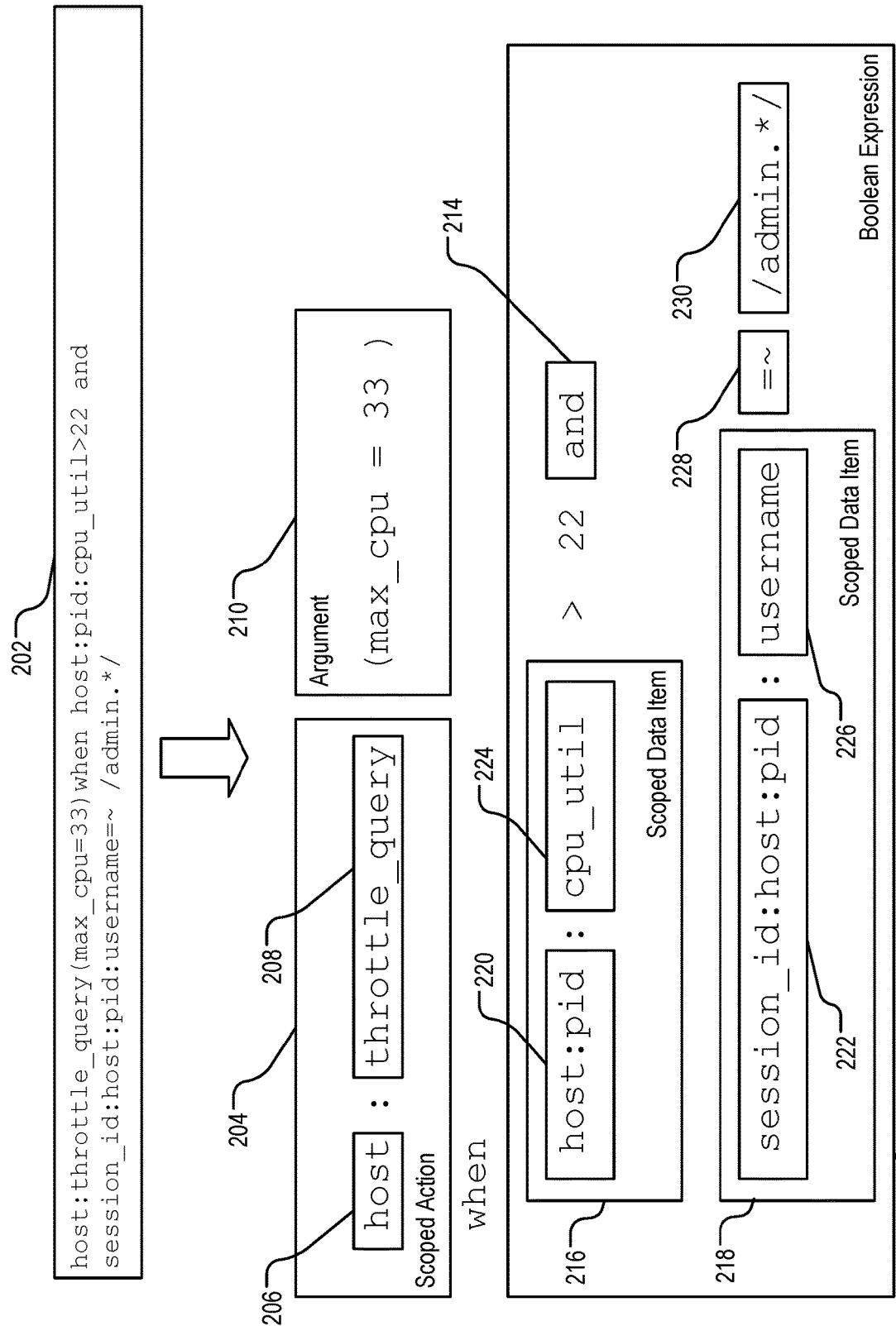
FIG. 2 is a diagram illustrating structure of an example rule in rule-based workload management.

FIG. 2 is a diagram illustrating structure of an example rule in rule-based workload management. Rule 202 is an example rule that performs the action of throttling a query. Rule 202 can include a scoped action 204. The scoped action 204 is an action that is programmed to be invoked for each set of data where all conditions are satisfied, in an action scope specified for the action. In the example shown, the scoped action 204 includes an action scope 206 and an action name 208. The action scope 206 ("host:" in this example) indicates where this action will be executed. An action scope of host, in this example, indicates that the action will be executed on the specific host that matches one or more tags corresponding to data scopes in the conditions. The action name 208 can specify an action to perform. The rule 202 can include action arguments 210.

The rule 202 has condition 212 including a Boolean expression. The Boolean expression can include one or more subexpressions joined by one or more Boolean operators, e.g., Boolean operator 214 ("AND"). Each subexpression can specify a scoped data item, an operator, and a value. In the example shown, a first subexpressions includes scoped data item 216. A second subexpression includes scoped data item 218. Each of the scoped data items 216 and 218 can include one or more tags. The tags can include a path including one or more scopes, e.g., scopes 220 and 222 and one or more data item identifiers, e.g., data item identifiers 224 and 226. In the example shown, the first subexpression has an operator ">" (greater than) and a value "22" whereas the second subexpression has an operator 228 "=~" (regular expression match) and a value 230 ("/admin.*/"). Rule 202 thus specifies that the action having the action name 208 is activated using action arguments 210 in action scope 206 when condition 212 is satisfied, e.g., when the Boolean expression is evaluated true for the data items identified by data item identifiers. In this example, the rule causes a distributed database system to throttles queries on each host where the host is using more than 22 percent of CPU for users whose names start from "admin" and followed by any string.

The following is a summary on various components of rule 202. Scoped action 204 includes action name 208 that specifies the action to be invoked for each set of data where all conditions are true. The action scope 206, ("host:") indicates that the action will be executed on the specific host that matches the data in the conditions.

An action that has no action scope is a global action for the cluster. Such an action can be triggered from a rule matching on any host but the action is global. For example, pg_terminate_backend, which cancels a query, is a global action because it is not valid to cancel a query on only a single host.

The action name 208, "throttle_query" in the example, is the name of the action to take for each set of data where all conditions are true. The action name 208 is followed by arguments that are unique to each action. In the example, the "max_cpu=33" argument tells action throttle_query to limit database processes for the query on the host to a maximum of 33% CPU utilization. The condition 212 portion of the rule 202 follows the "when" keyword and includes one or more data item comparisons connected by one or more Boolean operators 214, e.g., "and" or "or" operators. Comparisons can be enclosed in parentheses to indicate precedence. A rule can contain any number of such comparisons. For example, a condition can include the following Boolean expression.

host:pid:cpu_util>50 or
(host:pid:cpu_util>30 and session_id:host:pid:
   usename="fred")

Data items are collected by an agent, and can include operating system statistics, OS process statistics, and database query data. Like actions, data items are scoped. The scope specifies the source of the data items. For example, the path including "host:pid" scopes for the "cpu_util" data item means that the CPU utilization is the percentage of CPU used by an OS process executing on a specific host. The path including "session_id:host:pid" scopes for the usename data item indicates that the data is from a database segment query process executing on a host. Other data item scopes are host and session_id. A "host" scope qualifies data items that are from the operating system of a segment host. The session_id scope is used for data items for database queries that a workload manager calculates by aggregating data items from all segment nodes executing the query.

Data items can be compared to values or other data items using the following example operators of Table 1.

TABLE 1

Example Relations between Data Items and Values

| Operator | Value Format | Description |
|---|---|---|
| = | A number for numeric data items or a quoted string for strings. | Matches only when the values are exactly equal. |
| != | A number for numeric data items or a quoted string for strings. | Matches when the values are not equal. |
| =~ | Regular expression on the right side enclosed in /. E.g.: datum =~ /sel.*by/ | Performs a regular expression match between the string value and the specified regex. |
| > | Number | Greater than |
| < | Number | Less than |
| >= | Number | Greater than or equal to |
| <= | Number | Less than or equal to |

A client computer can add rule 202 to a distributed database system (e.g., distributed data system 102 of FIG. 1) using a "rule add" command through the command line interface. The syntax for the rule add command is shown in an example below in Listing 1.

rule add [transient] name action-scope action-name(action-args) when condition
    Listing 1. Example Rule Add Command Syntax In the rule add command, the optional keyword "transient" specifies that the rule is transient. A rule may be persistent or transient. A persistent rule remains active until it is deleted. A transient rule disappears when the rule processing module service is shut down on all hosts. Rules are persistent by default. The "name" field in the rule add command specifies a unique name for the rule. The "action-scope" field specifies a scope of an action to perform. The "action-name" field specifies the action to perform. Example actions can include a throttling query action that specifies a maximum allowed CPU utilization percentage for a database query, a terminate backend action that terminates a database session, and a database record action that records an event about a query.

The "action-args" are arguments that pass values to the action, if needed. An argument can be specified as an "arg-name=value" pair. Multiple arguments can be separated by boundary characters, e.g., commas.

The "condition" can be a Boolean expression that filters targets for the action. The condition references one or more data items to filter the facts that trigger the action. The condition may contain matches of regular expressions (regex).

The following example rule add command adds a persistent rule named "throttle_select_query" that throttles any query containing the text "select count" to a maximum of 20% of CPU. The entire command can be entered on one line through a command line interface.

cluster>rule add throttle_select_query host:throttle_query (max_cpu=20)
    when   session_id:host:pid:current_query=~/.*select count.*/
    Listing 2. An Example Rule Add Command In this example rule, host:throttle_query( ) is an action with one argument, max_cpu, which is set to 20. The condition after "when" indicates that the action is applied to any query that contains the text "select count." In the Boolean expression in the condition, session_id:host:pid matches any query fact. The current_query portion of the selector is a reference to a data item, which is the text of the query.

The following are example scoped actions that rules may specify.

TABLE 2

Example Scoped Actions

| Action | Description | Argument(s) |
|---|---|---|
| host:throttle_query | Throttle a query on a specified host | max_cpu - Hold process to a maximum of this percentage CPU utilization.<br>pid - The process to throttle.<br>session_id - The session to throttle. |
| pg_terminate_backend | Terminate a query on all hosts. The normal use case is to omit the argument and allow the session ID to be inferred by using the session_id in the rule's when clause. Workload Manager then determines which pid to terminate<br>The following example terminates any query that has been executing for more than 20 seconds:<br>cluster> rule add cancel_query pg_terminate_backend( )<br>when | session_id - The session ID of the query to terminate |

TABLE 2-continued

Example Scoped Actions

| Action | Description | Argument(s) |
|---|---|---|
| | session_id:host:pid:runtime > 20 | |
| db_record | Logs a message when a rule is matched. The normal use case is to only use the message argument and allow all other arguments to be inferred. The following example logs all queries: cluster> rule add record_query db_record(message="all") when session_id:host:pid:usename =~ /.*/ | current_query - text of the current query db_segment_role - Role of the segment; MASTER or SEGMENT host - A hostname of the segment message - Informative string describing the reason for recording pid - The postgres process associated with the query query_start - Query start time session_id - Session id of the query usename - Name of the user logged into this backend |

Best practices for rules include avoiding creating rules that modify the condition the rule's expression is matching. For example, rule "host:throttle_query(max_cpu=30) when host:pid:cpu_util>20 and session_id:host:pid:runtime>0" triggers at 20% CPU utilization and throttles the CPU to 30% utilization. The throttling continues until utilization drops below 20%. The session_id:host:pid:runtime condition is true for any running query and provides the necessary session_id for the throttle_query action. By comparison, if the values 30 and 20 are reversed, the rule can have a cyclic behavior. Best practices for rules include avoiding creating rules that terminate a query based on skew alone.

The following are example rules.

rule add cpu_skew_10 db_record(message="CPU: query skew 10") when session_id:cpu_skew>10 and session_id:host:pid:usename=~/.*/

Listing 3. Example Rule for Recording Queries where CPU Skew>10%:

rule add mem_skew_10 db_record(message="MEM: query skew 10") when session_id:resident_size_pct_skew>10 and session_id:host:pid:usename=~/.*/

Listing 4. Example Rule for Recording Queries where Memory Skew>10%:

rule add runtime_1 hrs pg_terminate_backend( ) when session_id:host:pid:runtime>3600

Listing 5. Example Rule for Terminating Queries That Run Longer Than 1 Hour rule add transient mem_high_segment_useage_20 db_record(message="MEM: high segment pct usage–20%") when host:pid:resident_size_pct>20 and session_id:host:pid:usename=~/.*/

Listing 6. Example Rule for Recording Queries Having High Memory Usage

The following table lists data items collected by a workload manager. These data items can be used in workload manager rules to select facts that trigger an action. In rules, a scope is added as a prefix of a data item, for example: "host:cpu_util>35."

TABLE 3

Example Scoped Data Items

| Scope | Data Item | Data type | Description |
|---|---|---|---|
| host | day | int | Day as 0-30 |
| host | day_of_week | int | Day as 0-6 |
| host | day_of_week_string | string | Mon, Tue, . . . |
| host | hour | int | Hour as 0-23 |
| host | minute | int | Minute as 0-59 |
| host | month | int | Month as 0-11 |
| host | node_cpu_util | float | Current CPU utilization on this host, normalized by number of active CPUs. |
| host | year | int | Numeric year |
| host:pid | resident_size_pct | float | The size of this process' resident memory as a percentage of total system memory. |
| host:pid | program_size_pct | float | The size of this process as a percentage of total system memory. |
| host:pid | dirty_size_bytes | integer | The size of dirty pages used in this process (bytes). |

TABLE 3-continued

Example Scoped Data Items

| Scope | Data Item | Data type | Description |
|---|---|---|---|
| host:pid | data_size_bytes | integer | The size of data + stack memory region in this process (bytes). |
| host:pid | library_size_bytes | integer | The size of library memory region in this process (bytes). |
| host:pid | text_size_bytes | integer | The size of code memory region in this process (bytes). |
| host:pid | shared_size_bytes | integer | The size of all shared pages used by this process (bytes). |
| host:pid | resident_size_bytes | integer | The size of resident memory consumed by this process (bytes). |
| host:pid | program_size_bytes | integer | The total program size (bytes). |
| host:pid | writes_per_sec | float | The number of total write calls per second by this process. |
| host:pid | reads_per_sec | float | The number of total read calls per second by this process. |
| host:pid | disk_write_bytes_per_sec | float | The number of bytes written to disk per second by this process. |
| host:pid | disk_read_bytes_per_sec | float | The number of bytes read from disk per second by this process. |
| host:pid | write_bytes_per_sec | float | The number of bytes written per second (disk + net + IPC) by this process. |
| host:pid | read_bytes_per_sec | float | The number of bytes read per second (disk + net + IPC) by this process. |
| host:pid | writes | integer | Total number of write system calls made by this process. |
| host:pid | reads | integer | Total number of read system calls made by this process. |
| host:pid | disk_write_bytes | integer | Total number of bytes written to disk by this process. |
| host:pid | disk_read_bytes | integer | Total number of bytes read from disk by this process. |
| host:pid | write_bytes | integer | Total number of bytes (disk, network, IPC) written by this process. |
| host:pid | read_bytes | integer | Total number of bytes (disk, network, IPC) read by this process. |
| host:pid | avg_cpu_util | float | Average CPU utilization consumed by this process over the last two polling intervals. |
| host:pid | cpu_util | float | Percentage of total CPU utilization consumed by this process. |
| host:pid | state | string | Kernel state of this process; the man page for proc for more information. |
| host:pid | long_name | string | By default, this is the absolute path to the process executable, but may be overridden by the process itself to status information in utilities like ps. |
| host:pid | name | string | The filename of the executable. |
| session_id | cpu_skew | float | CPU utilization skew across the cluster. |

TABLE 3-continued

Example Scoped Data Items

| Scope | Data Item | Data type | Description |
|---|---|---|---|
| | | | Calculated as the cubed standard deviation of session_id:host:total_cpu from all hosts running a certain query. |
| session_id | resident_size_pct_skew | float | Resident memory utilization skew across the cluster. Calculated as the cubed standard deviation of session_id:host:total_resident_size_pct from all hosts running a certain query. |
| session_id | disk_read_bytes_per_sec_skew | float | Disk read skew across the cluster. Calculated as the cubed standard deviation of session_id:host:total_disk_read_bytes_per_sec from all hosts running a certain query. |
| session_id | disk_write_bytes_per_sec_skew | float | Disk write skew across the cluster. Calculated as the cubed standard deviation of session_id:host:total_disk_write_bytes_per_sec from all hosts running a certain query. |
| session_id:host | total_cpu | float | Total cpu utilization of all processes running a certain query on a host. |
| session_id:host | total_disk_read_bytes_per_sec | int | Total disk read bytes-per-second of all processes running a certain query on a host. |
| session_id:host | total_disk_write_bytes_per_sec | int | Total disk write bytes-per-second of all processes running a certain query on a host. |
| session_id:host | total_resident_size_pct | float | Total resident memory % of all processes running a certain query on a host. |
| session_id:host:pid | xact_start | string | Time when this process' current transaction was started |
| session_id:host:pid | application_name | string | Name of the application that is connected to this backend |
| session_id:host:pid | client_port | integer | TCP port number that the client is using for communication with this backend |
| session_id:host:pid | client_addr | string | IP address of the client connected to this backend |
| session_id:host:pid | backend_start | string | Time when this process was started, i.e., when the client connected to the server |
| session_id:host:pid | usesysid | integer | OID of the user logged into this backend |
| session_id:host:pid | datname | string | Name of the database this backend is connected to |
| session_id:host:pid | datid | integer | OID of the database this backend is connected to |
| session_id:host:pid | spillfile_count_across_cluster | integer | total number of spill files across the cluster created for this query |
| session_id:host:pid | spillfile_size_across_cluster | integer | total size of spill files across the cluster created for this query |
| session_id:host:pid | runtime | integer | Time since the query started |
| session_id:host:pid | gpdb_segment_role | string | the current role of this GPDB segment |

TABLE 3-continued

Example Scoped Data Items

| Scope | Data Item | Data type | Description |
|---|---|---|---|
| | | | (MASTER, SEGMENT, MIRROR) |
| session_id:host:pid | query_start | string | Time when the currently active query was started |
| session_id:host:pid | usename | string | Name of the user logged into this backend |
| session_id:host:pid | current_query | string | Text of this backend's current query |

Figure 3:
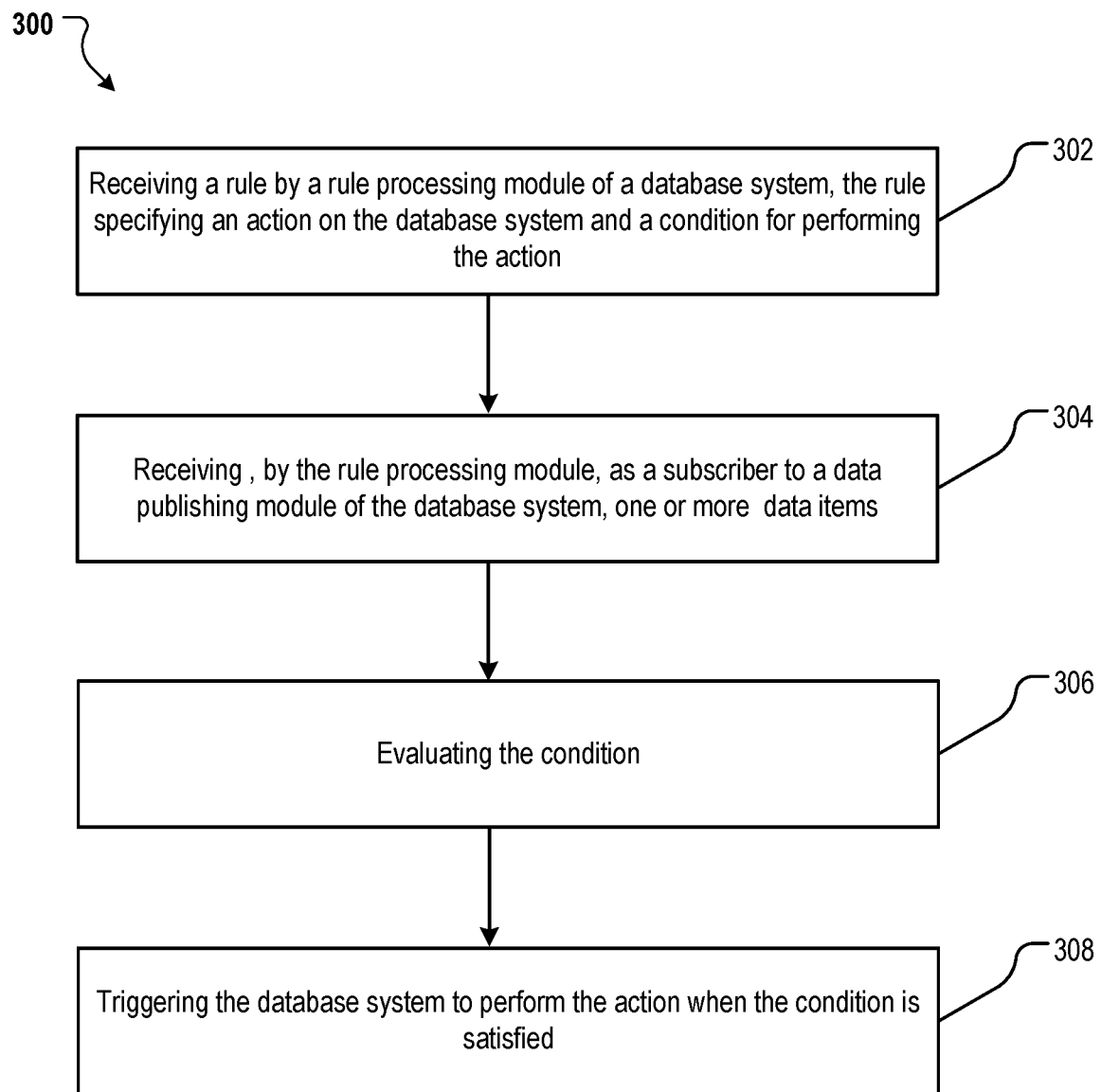
FIG. 3 is a flowchart illustrating an example process of rule-based workload management.

FIG. 3 is a flowchart illustrating an example process 300 of rule-based workload management. Process 300 can be performed by a node of database system, e.g., node 104 of distributed database system 102 of FIG. 1.

A rule processing module of the node receives (302) a rule, e.g., rule 202 of FIG. 2. The rule specifies an action on the database system and a condition for performing the action. The condition includes a first value, one or more tags corresponding to the first value, and a relation between the one or more tags and the first value. The relation can include at least one of a comparison or a regular expression match. The rule can be in pre-compiled form. If the rule is not in a pre-compiled form, the rule processing module can compile the rule as necessary.

Receiving the rule can be triggered by an "add rule" command. The add rule command specifies a rule name and whether the rule is transient or persistent. A persistent rule remains active until deleted. A transient rule stops being active upon a shutdown of the rule processing module. The action has an action scope specifying whether the action is a global action to be performed on each node of the database system or a local action to be performed on a specific node of the database system.

The rule processing module can subscribe from a data publishing module to data items that have an identifier that matches at least one of the one or more tags. The data publishing module publishes the one or more data items and their corresponding metadata upon entry of the data items into the database system. The rule processing module receives (304), as a subscriber to the data publishing module of the database system, one or more data items. Each data item is a self-describing data item that includes data and metadata describing the data. For each data item, the metadata includes a respective second value and one or more data scopes associated with the respective second value. Each data scope represents a respective context of the data.

The rule processing module evaluates (306) the condition in the received rule to determine whether the condition is satisfied for each data item. The rule processing module performs the evaluation using the metadata associated with the one or more data items upon publication of the one or more data items. The evaluation includes, for each data item, determining that the one or more tags of the condition match the one or more data scopes of the data item and that the first value of the condition and the second value of the data item satisfy the relation of the condition.

The rule processing module triggers (308) the database system to perform the action in response to determining that the condition is satisfied. The action can include at least one of displaying resource usage status of the database system, displaying a representation of data in the data items, globally cancelling a query, locally cancelling a query, or throttling a query.

The database system can dynamically display the self-describing data items as well as statics of the system. The rule processing module, or a data display module, can subscribe to data items as specified in one or more rules based on scope. Upon receiving the subscribed data items, the module can store the received data items in a nested hash-based data structure. The module can collate the data items through paths of commonality of scope. The module can display the data items on a display device. The module can display the data items in a fully dynamic process without foreknowledge of the data. The module can display the data items in custom structured form driven by configuration which pre-defines scope paths of interest. A path can include a series of scopes, e.g., "session_id:host:pid:" that can be in random order. Using the scopes and conditions, the module can display data upon determining, for example, a query has run for X seconds on a particular host.

Figure 4:
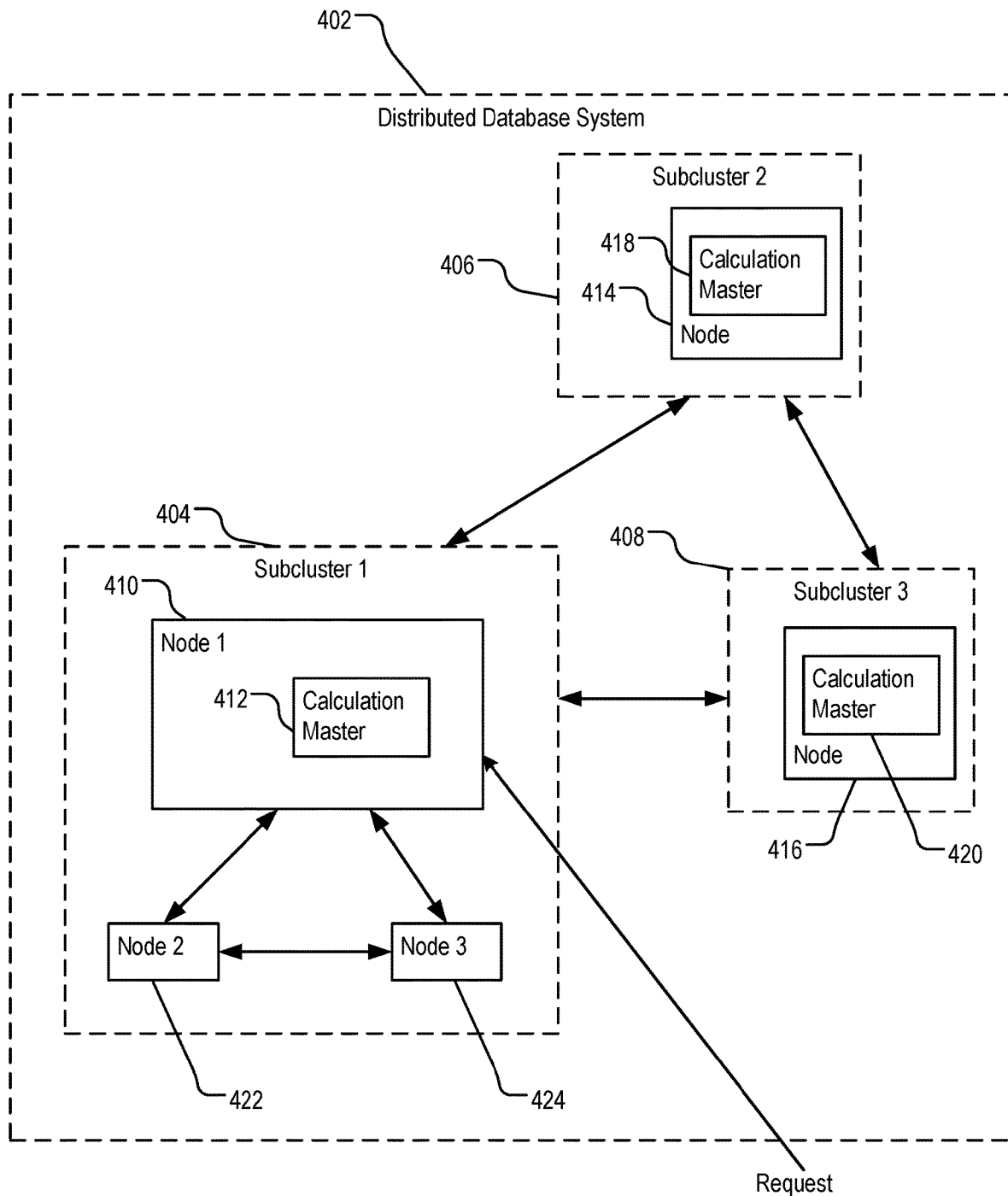
FIG. 4 is a block diagram illustrating example techniques of performing global computation in a distributed database system.

FIG. 4 is a block diagram illustrating example techniques of performing global computation in a distributed database system. Example distributed database system 402 can be a MPP database system, e.g., Greenplum Database, that includes a cluster of nodes. Each node can be a node having components as described above in reference to FIG. 1. The cluster of nodes can be organized in subclusters 404, 406 and 408. Each subcluster 404, 406 and 408 includes a respective master node for the subcluster and one or more respective segment nodes. The nodes between subcluster 404, 406 and 408 communicate through dedicated and centralized channels.

Some calculations performed on the distributed database system 402 require data from each node. Due to large size of the cluster, all the data may not be available to a single node for calculation. For example, node 410 of subcluster 404 receives a request to calculation a skew of the distributed database system 402. The skew is a cubed standard deviation of a local data item across the entire cluster. A calculation master 412 can distributed the skew calculation is distributed across the cluster to a number of subcluster nodes. For example, the calculation master 412 can distribute the skew computation to a node 414 of subcluster 406 and a node 416 of subcluster 408. Each of the nodes 414 and 416 hosts a respective calculation master, e.g., calculation master 418 and calculation master 420, respectively.

Each of the calculation masters 412, 418 and 420 performs a series of local computations corresponding to the nodes in subclusters 404, 406, and 408, respectively. For example, calculation master 412 can perform a portion of the skew calculation for nodes 410, 422 and 424. The calculation masters 412, 418 and 420 then publish the results of the local computation as intermediate results. The calculation masters 412, 418 and 420 subscribe to one another for the intermediate results. Upon receiving intermediate results from other calculation masters, each of calculation masters 412, 418 and 420 uses the totality of the intermediate results from all other calculation masters to compute the skew. This tiered distribution of the calculation has the advantage of minimizing the amount of data exchanged between nodes and between subclusters.

Figure 5:
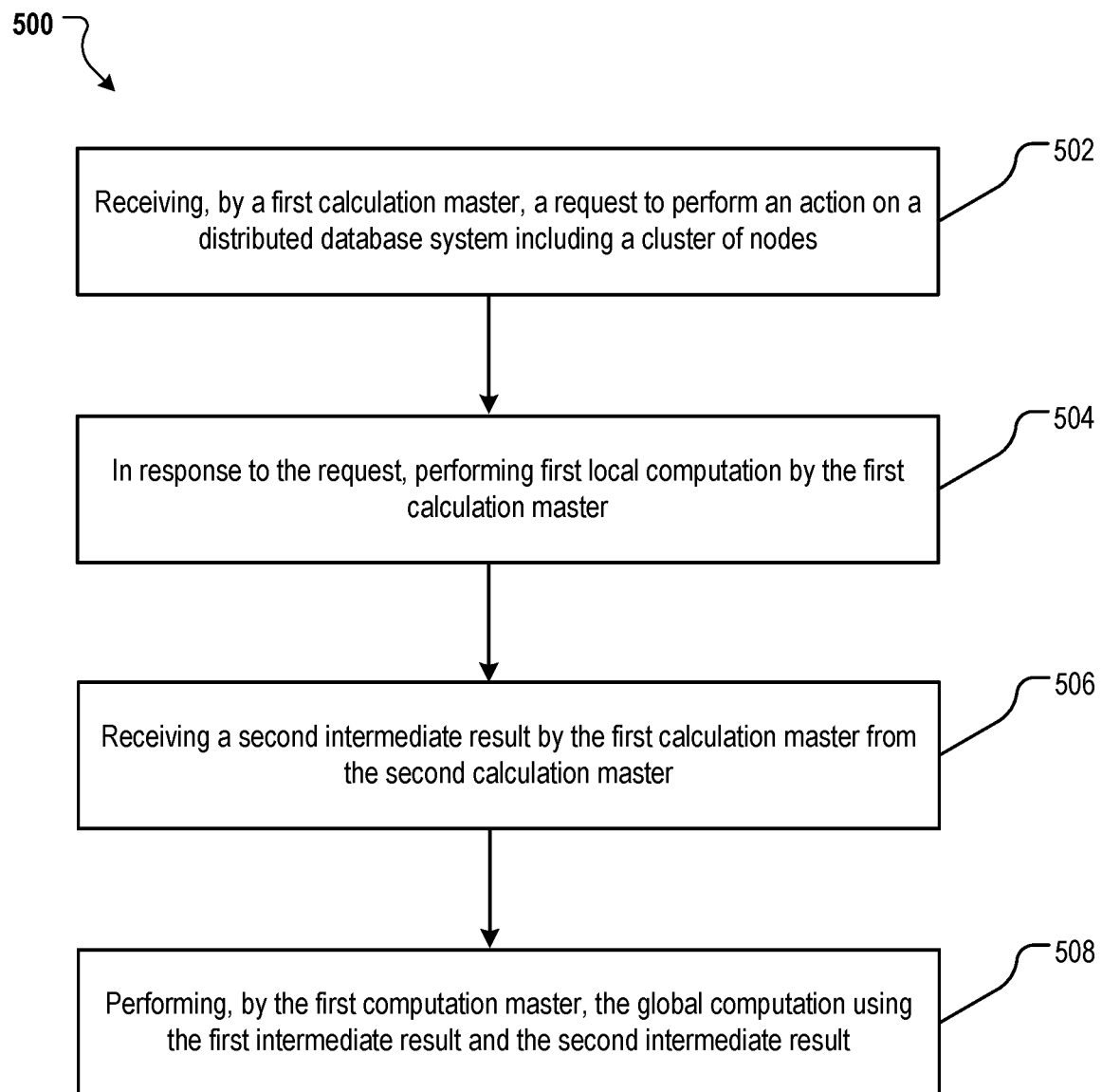
FIG. 5 is a flowchart illustrating an example process of performing global computation in a distributed database system.

FIG. 5 is a flowchart illustrating an example process 500 of performing global computation in a distributed database system. Process 500 can be performed by one or more of nodes 410, 414 or 416 of FIG. 4.

A first calculation master on a node receives (502) a request to perform an action on a distributed database system including a cluster of nodes. The nodes of the cluster are organized as multiple subclusters including a first subcluster and a second subcluster, each subcluster including one or more nodes. The first calculation master executes on a node in the first subcluster. A second calculation master executes on a node in the second subcluster. The action includes a global computation that uses data from each node of the cluster of nodes.

In response to the request, the first calculation master performs (504) first local computation. The first calculation master performs the first local computation using first local data from each node in the first subcluster to determine a first intermediate result. The first local computation includes a portion of the global computation that corresponds to the first subcluster. The first calculation master can submit the first intermediate result by the first calculation master to the second calculation master through publication.

The first calculation master receives (506) a second intermediate result from the second calculation master. The second calculation master can provide the second intermediate result to the first calculation master through publication. The second intermediate result includes a result of second local computation performed by the second calculation master using second local data from each node in the second cluster. The second local computation includes a portion of the global computation that corresponds to the second subcluster.

The first computation master performs (508) the global computation using the first intermediate result and the second intermediate result. Likewise, the second calculation master can perform the global computation using the first intermediate result and the second intermediate result. The global computation can include a skew computation that computes a skew based on standard deviation of a value of an attribute of the distributed database system across each node in the cluster. The skew can be based on a cube of the standard deviation, and wherein the attribute is a resource usage. The distributed database system can perform a system operation or database operation conditioned upon a result of the global computation. The system operation or database operation can include, for example, displaying data, throttle a query, or terminating a query.

Figure 6:
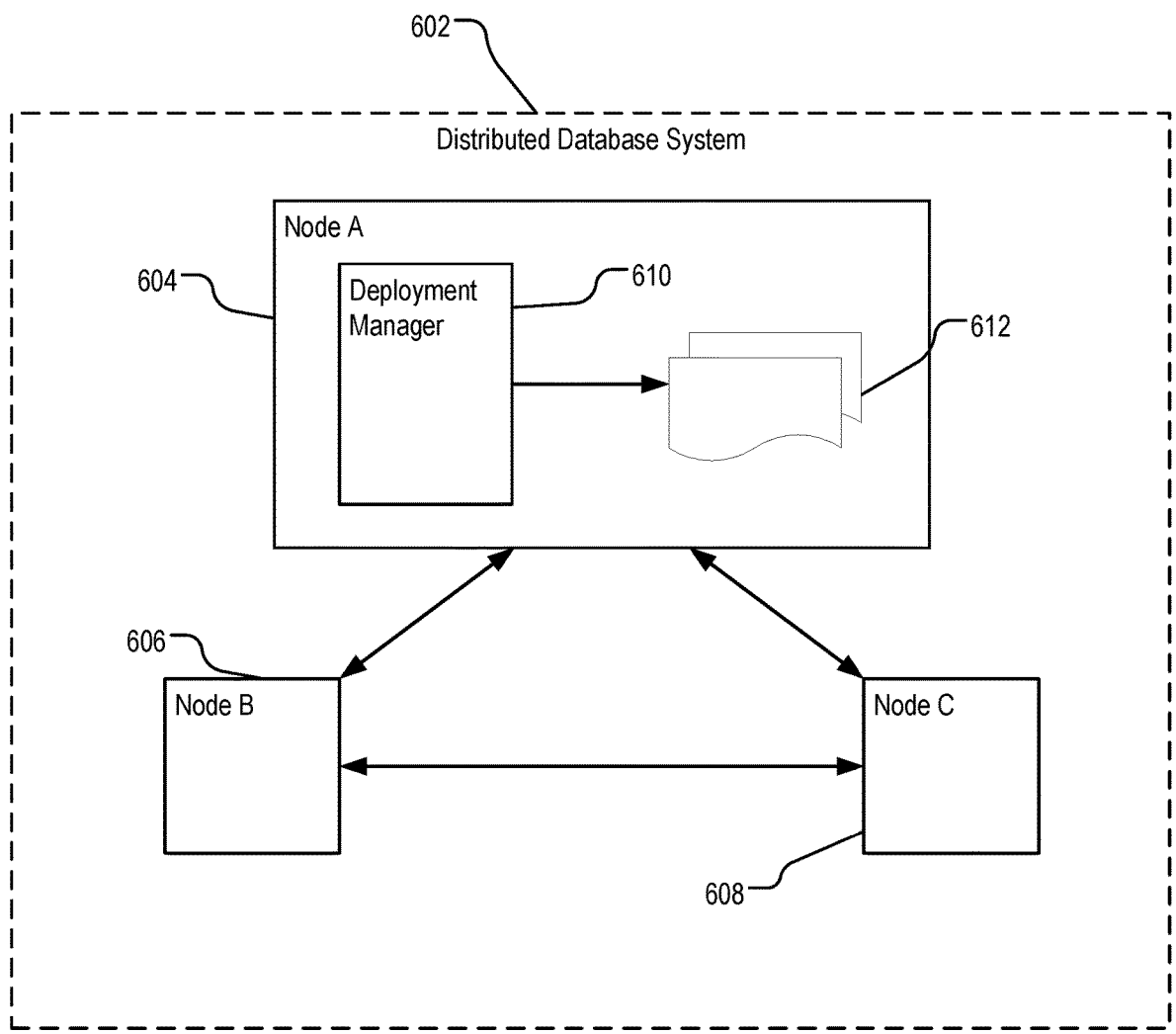
FIG. 6 is a block diagram illustrating example techniques of autonomous software deployment on a distributed database system.

FIG. 6 is a block diagram illustrating example techniques of autonomous software deployment on a distributed database system. Distributed database system 602 includes a cluster of one or more nodes including one or more master nodes and one or more segment nodes. For example, distributed database system 602 has nodes 604, 606 and 608. Each of nodes 604, 606 and 608 can be a master node or a segment node. A deployment manager 610 executes on node 604. The deployment manager 610 is configured to deploy software to each node in the cluster of nodes in the distributed database system 602.

Deployment of software to the database cluster is autonomous. The software can include multiple components including bare software, e.g., an executable, and configuration information, e.g., parameters specified in a ".conf" file associated with the executable. The deployment manager 610 obtains a definitive list of database cluster nodes from a database master node. The deployment manager 610 pushes the bare software to nodes 606 and 608 in bootstrap mode. In the bootstrap mode, nodes 606 and 608 connect to a predefined point and await authoritative configuration packages. In the example shown, the predefined point is on node 604. In various implementations, the predefined point can be a node other than the node hosting a deployment manager. The deployment manager 610 generates configuration packages 612. The configuration packages 612 includes a tailored configuration package for each node. The configuration packages 612 publishes configuration packages 612. Each of the bootstrap mode nodes 606 and 608 subscribes to the publication and receives a respective configuration packages. Upon receipt of the configuration package, each of nodes 606 and 608 restarts all daemons in production mode and the cluster of nodes, or multiple subclusters of nodes, enter into the final runtime state.

The deployment manager 610 performs installations and upgrades in a globally (cluster-wide) atomic fashion to ensure the version of software running across the cluster are always consistent. If a new node is added to the distributed database system 602, the deployment manager 610, upon receiving information indicating that the new node is added, can push the software and distribute the configuration file to enable the new node to operate consistently with existing nodes 606 and 608.

In addition to software installation and update, the deployment manager 610 can dynamically reconfigure a topology of the distributed database system 602. Reconfiguring the topology can include, for example, moving a node from a first subcluster to a second subcluster based on rules described in reference to FIGS. 1-3. For example, the distributed database system 602 can coordinate with a rule processing module to move a node to a subcluster, where the move is triggered by a determination by the rule processing module that the CPU load of each node in the subcluster exceeds a threshold.

Figure 7:
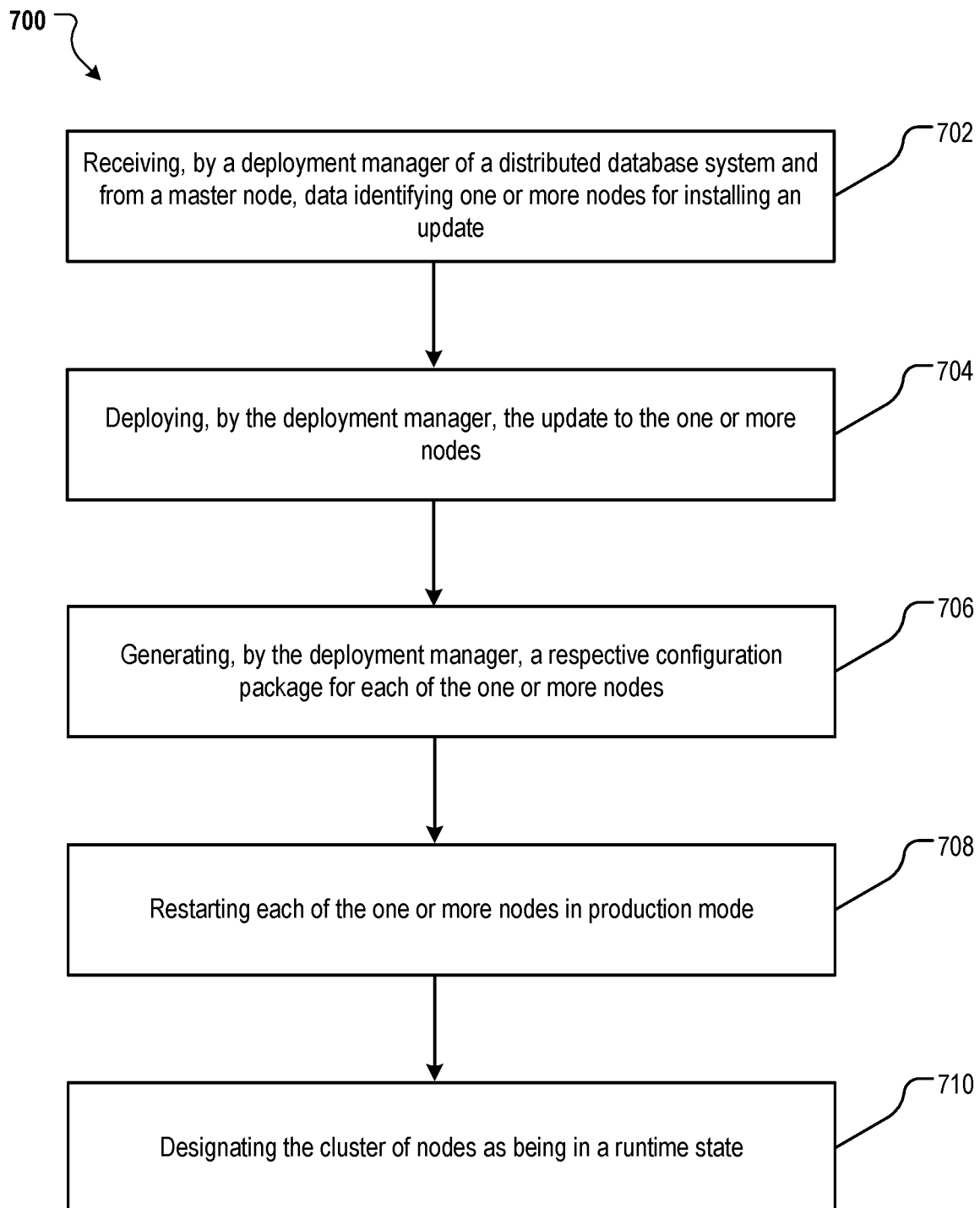
FIG. 7 is a flowchart illustrating an example process of autonomous software deployment.

FIG. 7 is a flowchart illustrating an example process 700 of autonomous software deployment. Process 700 can be performed by a node of a distributed database system, e.g., example node 604 of FIG. 6.

A deployment manager on the node of a distributed database system receives (702) from a master node of the distributed database system data identifying one or more nodes for installing an update. The distributed database system includes a cluster of nodes including the master node and the one or more nodes for installing the update. The update can include at least one of software installation or cluster topology reconfiguration.

The deployment manager deploys (704) the update to the one or more nodes. Deploying the update includes pushing the update to the one or more nodes and instructing each of the one or more nodes to restart in a bootstrap mode. In the bootstrap mode, each of the one or more modes connects to a pre-identified node and waits for configuration information.

The deployment manager generates (706) a respective configuration package for each of the one or more nodes.

Each configuration package is tailored to characteristics of the corresponding node, e.g., CPU speed, memory size, or storage capacity. The deployment manager can publish each configuration package by the deployment manager at the pre-identified node.

After the configuration packages are received by the one or more nodes, the deployment manager restarts (708) each of the one or more nodes in production mode. Restarting the nodes includes causing each node to execute the update using configuration information in the respective configuration package.

In some implementations, the cluster of nodes are organized into a plurality of subclusters each including a respective group of nodes. Pushing the update to the one or more nodes comprises pushing the update to a respective node in each subcluster that hosts a deployment manager. Executing the update can include reconfiguring the subclusters, including designating a node that is previously in a first subcluster as a node in a second subcluster. The deployment manager, another component of the database system, or both, can trigger reconfiguring the subclusters upon a determination that a resource usage skew at the second cluster exceeds a threshold value.

Upon each of the one or more nodes in the production mode having restarted, the configuration manager designates (710) the cluster of nodes as being in a runtime state. In the runtime state, each node in the cluster of nodes is ready to provide services including storing data and responding database queries.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method for autonomously updating nodes in a distributed database system comprising a plurality of computers, the distributed database system comprising a master node and a plurality of deployment manager nodes, one respective deployment manager node for each subcluster of a plurality of subclusters of nodes in the distributed database system, the method comprising:

computing respective resource usage skews of the plurality of subclusters;

determining, by at least the plurality of deployment manager nodes, that the resource usage skews at one or more of the plurality of subclusters exceed a threshold value; and in response to the determining:

reconfiguring a topology of the distributed database system, comprising:

receiving, by each deployment manager node of each respective subcluster from the master node, respective data identifying one or more nodes belonging to the respective subcluster on which to install an update, wherein a particular deployment manager node receives data indicating that a particular node has been reassigned to a different subcluster, the different subcluster being managed by the particular deployment manager node;

pushing, by each deployment manager node, an update to each of one or more nodes belonging to a respective subcluster of the deployment manager node and instructing each of the one or more nodes belonging to the subcluster to restart in a bootstrap mode, connect to a deployment manager node, and wait for configuration information from the deployment manager node, the configuration information being tailored for each of one or more nodes in a respective subcluster of the deployment manager node;

generating, by each deployment manager node, respective configuration information tailored for each of one or more nodes in a respective subcluster of the deployment manager node;

providing, by each deployment manager node to each of one or more nodes in a respective subcluster of the deployment manager node, the respective generated configuration information tailored for each of the one or more nodes in the respective subcluster of the deployment manager node;

providing the update by each deployment manager node to each of one or more nodes in a respective subcluster of the deployment manager node;

providing, by each deployment manager node to all nodes in a respective subcluster of the deployment manager node that were restarted in bootstrap mode to receive the update, a command to restart in production mode to install the update using the configuration information tailored for the one or more nodes in the subcluster of the deployment manager node; and restarting in production mode by all nodes in all of the subclusters, thereby causing each node to install the update using configuration information in the respective configuration information tailored for nodes in a respective subcluster received from the respective deployment manager node for the subcluster.

2. The method of claim 1, wherein installing the update causes a node that is previously in a first subcluster to become a node in a different second subcluster.

3. The method of claim 1, wherein the update includes at least one of software installation or cluster topology reconfiguration.

4. The method of claim 1, further comprising:
   restarting in bootstrap mode by each of the one or more nodes belonging to each respective subcluster;
   connecting, by each of the one or more nodes belonging to each respective subcluster, to a pre-identified deployment manager node; and
   waiting for configuration information from the pre-identified deployment manager node.

5. One or more non-transitory computer storage media storing instructions that, when executed by one or more computers of a distributed database system, the distributed database system comprising a master node and a plurality of deployment manager nodes, one respective deployment manager node for each subcluster of a plurality of subclusters of nodes, cause the one or more computers to perform operations comprising:
   computing respective resource usage skews of the plurality of subclusters;
   determining, by at least the plurality of deployment manager nodes, that the resource usage skews at one or more of the plurality of subclusters exceed a threshold value; and
   in response to the determining:
      reconfiguring a topology of the distributed database system, comprising:
         receiving, by each deployment manager node of each respective subcluster from the master node, respective data identifying one or more nodes belonging to the respective subcluster on which to install an update, wherein a particular deployment manager node receives data indicating that a particular node has been reassigned to a different subcluster, the different subcluster being managed by the particular deployment manager node;
         pushing, by each deployment manager node, an update to each of one or more nodes belonging to a respective subcluster of the deployment manager node and instructing each of the one or more nodes belonging to the subcluster to restart in a bootstrap mode, connect to a deployment manager node, and wait for configuration information from the deployment manager node, the configuration information being tailored for each of one or more nodes in a respective subcluster of the deployment manager node;
         generating, by each deployment manager node, respective configuration information tailored for each of one or more nodes in a respective subcluster of the deployment manager node;
         providing, by each deployment manager node to each of one or more nodes in a respective subcluster of the deployment manager node, the respective generated configuration information tailored for each of the one or more nodes in the respective subcluster of the deployment manager node;
         providing the update by each deployment manager node to each of one or more nodes in a respective subcluster of the deployment manager node;
         providing, by each deployment manager node to all nodes in a respective subcluster of the deployment manager node that were restarted in bootstrap mode to receive the update, a command to restart in production mode to install the update using the configuration information tailored for the one or more nodes in the subcluster of the deployment manager node; and
         restarting in production mode by all nodes in all of the subclusters, thereby causing each node to install the update using configuration information in the respective configuration information tailored for nodes in a respective subcluster received from the respective deployment manager node for the subcluster.

6. The one or more non-transitory computer storage media of claim 5, wherein installing the update causes a node that is previously in a first subcluster to become a node in a different second subcluster.

7. The one or more non-transitory computer storage media of claim 5, wherein the update includes at least one of software installation or cluster topology reconfiguration.

8. The one or more non-transitory computer storage media of claim 5, wherein the operations further comprise:
   restarting in bootstrap mode by each of the one or more nodes belonging to each respective subcluster;
   connecting, by each of the one or more nodes belonging to each respective subcluster, to a pre-identified deployment manager node; and
   waiting for configuration information from the pre-identified deployment manager node.

9. A system comprising:
   one or more computers and one or more storage devices of a distributed database system comprising a master node and a plurality of deployment manager nodes, one respective deployment manager node for each subcluster of a plurality of subclusters of nodes, wherein the one or more storage devices store instructions that are operable, when executed by the one or more computers, to cause the one or more computers to perform operations comprising:
   computing respective resource usage skews of the plurality of subclusters;
   determining, by at least the plurality of deployment manager nodes, that the resource usage skews at one or more of the plurality of subclusters exceed a threshold value; and
   in response to the determining:
      reconfiguring a topology of the distributed database system, comprising:
         receiving, by each deployment manager node of each respective subcluster from the master node, respective data identifying one or more nodes belonging to the respective subcluster on which to install an update, wherein a particular deployment manager node receives data indicating that a particular node has been reassigned to a different subcluster, the different subcluster being managed by the particular deployment manager node;
         pushing, by each deployment manager node, an update to each of one or more nodes belonging to a respective subcluster of the deployment manager node and instructing each of the one or more nodes belonging to the subcluster to restart in a bootstrap mode, connect to a deployment manager node, and wait for configuration information from the deployment manager node, the configuration information being tailored for each of one or more nodes in a respective subcluster of the deployment manager node;
         generating, by each deployment manager node, respective configuration information tailored for each of one or more nodes in a respective subcluster of the deployment manager node;

providing, by each deployment manager node to each of one or more nodes in a respective subcluster of the deployment manager node, the respective generated configuration information tailored for each of the one or more nodes in the respective subcluster of the deployment manager node;

providing the update by each deployment manager node to each of one or more nodes in a respective subcluster of the deployment manager node;

providing, by each deployment manager node to all nodes in a respective subcluster of the deployment manager node that were restarted in bootstrap mode to receive the update, a command to restart in production mode to install the update using the configuration information tailored for the one or more nodes in the subcluster of the deployment manager node; and restarting in production mode by all nodes in all of the subclusters, thereby causing each node to install the update using configuration information in the respective configuration information tailored for nodes in a respective subcluster received from the respective deployment manager node for the subcluster.

10. The system of claim 9, wherein installing the update causes a node that is previously in a first subcluster to become a node in a different second subcluster.

11. The system of claim 9, wherein the update includes at least one of software installation or cluster topology reconfiguration.

12. The system of claim 9, wherein the operations further comprise:
  restarting in bootstrap mode by each of the one or more nodes belonging to each respective subcluster;
  connecting, by each of the one or more nodes belonging to each respective subcluster, to a pre-identified deployment manager node; and
  waiting for configuration information from the pre-identified deployment manager node.

* * * * *